US012695840B2

(12) United States Patent (10) Patent No.: US 12,695,840 B2
Nakai et al. (45) Date of Patent: Jul. 28, 2026

(54) OPTICAL SCANNING DEVICE AND IMAGE FORMING APPARATUS INCLUDING SAME

(71) Applicant: KYOCERA Document Solutions Inc., Osaka (JP)

(72) Inventors: Jun Nakai, Osaka (JP); Takuto Kunimasa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 279 days.

(21) Appl. No.: 18/640,623

(22) Filed: Apr. 19, 2024

(65) Prior Publication Data

US 2024/0364832 A1     Oct. 31, 2024

(30) Foreign Application Priority Data

Apr. 26, 2023    (JP) ................................. 2023-072293

(51) Int. Cl.
H04N 1/387 (2006.01)
H04N 1/00 (2006.01)

(52) U.S. Cl.
CPC ....... H04N 1/3878 (2013.01); H04N 1/00018 (2013.01); H04N 1/00031 (2013.01); H04N 1/00045 (2013.01); H04N 1/00082 (2013.01); H04N 1/00254 (2013.01)

(58) Field of Classification Search
CPC ............. H04N 1/3878; H04N 1/00018; H04N 1/00031; H04N 1/00045; H04N 1/00082; H04N 1/00254
See application file for complete search history.

(56) References Cited

U.S. PATENT DOCUMENTS 8,902,463 B2 * 12/2014 Shukuya .................. G06K 1/00
358/1.12
2012/0224191 A1 * 9/2012 Abe .................... G03G 15/5058
358/1.5

FOREIGN PATENT DOCUMENTS

JP        2006-078725 A      3/2006
JP        2010-039179 A      2/2010

* cited by examiner

*Primary Examiner* — Huo Long Chen
(74) *Attorney, Agent, or Firm* — Stein IP, LLC

(57) ABSTRACT

An optical scanning device includes a scanning optical system, a housing, a skew adjustment mechanism, and a control unit. The skew adjustment mechanism rotates a skew adjustment motor in a fixed direction, so as to periodically change position of an optical element. When rotating the skew adjustment motor by a rotation amount corresponding to a half period of position change of the optical element, average value of the position change of the optical element is substantially the same as average value of the position change of the optical element per one period. The control unit calculates rotation amount of the skew adjustment motor necessary for returning the optical element to the reference position, on the basis of rotation amounts of the skew adjustment motor at three points obtained by equally dividing the position change of the optical element per half period into two, and skew amounts.

5 Claims, 10 Drawing Sheets

FIG.3

MOTOR ROTATION AMOUNT [Puls]

MOTOR ROTATION AMOUNT [Puls]

MOTOR ROTATION AMOUNT [Puls]

MOTOR ROTATION AMOUNT [Puls]

OPTICAL SCANNING DEVICE AND IMAGE FORMING APPARATUS INCLUDING SAME

INCORPORATION BY REFERENCE

This application is based upon and claims the benefit of priority from the corresponding Japanese Patent Application No. 2023-72293 filed Apr. 26, 2023, the entire contents of which are hereby incorporated by reference.

BACKGROUND

The present disclosure relates to an optical scanning device of an electrophotographic image forming apparatus, which emits light to an image carrier so as to form an electrostatic latent image, and to an image forming apparatus equipped with the optical scanning device.

In recent years, color printers and copiers are required to have high image quality and high productivity. In addition, they are also required to have performance capable of maintaining initial high image quality in images that are continuously printed and output, too. It is very important for maintaining high image quality to correctly adjust print position displacement of each color (color shift) in a color image and to maintain the same. Causes of color shift in the optical scanning device include positional displacement in a main scanning direction, positional displacement due to equal magnification difference of main scanning, positional displacement in a sub-scanning direction, positional displacement due to scanning curvature, positional displacement due to scanning inclination, and the like. Among them, the positional displacement in the main scanning direction, the positional displacement due to the equal magnification difference of main scanning, the positional displacement in the sub-scanning direction, and the positional displacement due to scanning curvature can be corrected relatively easily by light emission control of the optical scanning device.

The scanning inclination can also be corrected similarly to the scanning curvature, but in general its correction amount is larger than that of the scanning curvature. For this reason, the amount of image data to be stored in a memory becomes large, which causes increase in cost of the device that performs the light emission control. Therefore, correction of the scanning inclination (skew adjustment) is performed by inclining an optical member close to a photoreceptor, such as a scanning lens or a reflecting mirror.

SUMMARY

An optical scanning device according to an aspect of the present disclosure includes a scanning optical system, a housing, a skew adjustment mechanism, and a control unit, and it exposes a surface of an image carrier so as to form an electrostatic latent image whose charge is decreased. The scanning optical system scans the image carrier with a light beam. The housing holds optical elements constituting the scanning optical system. The skew adjustment mechanism corrects scanning inclination by changing position of the optical element from a reference position. The control unit controls drive of the skew adjustment mechanism. The skew adjustment mechanism includes a skew adjustment motor for adjusting an angle of the optical element, and rotates the skew adjustment motor in a fixed direction so that the position of the optical element changes periodically, and that when rotating the skew adjustment motor by a rotation amount corresponding to a half period of position change of the optical element from an arbitrary position of the optical element, average value of the position change of the optical element before and after rotating the skew adjustment motor is substantially the same as average value of the position change of the optical element per one period. When returning the optical element to the reference position, the control unit forms a reference image on the image carrier so as to measure skew amount of the optical element, and calculates rotation amount of the skew adjustment motor necessary for returning the optical element to the reference position, on the basis of rotation amounts of the skew adjustment motor at three points obtained by equally dividing the position change of the optical element per half period into two, and the measured skew amount.

BRIEF DESCRIPTION OF THE DRAWINGS

FIG. 3 is a diagram illustrating a reference image for color shift correction.

DETAILED DESCRIPTION

[1. Overall Structure of Image Forming Apparatus]

Figure 1:
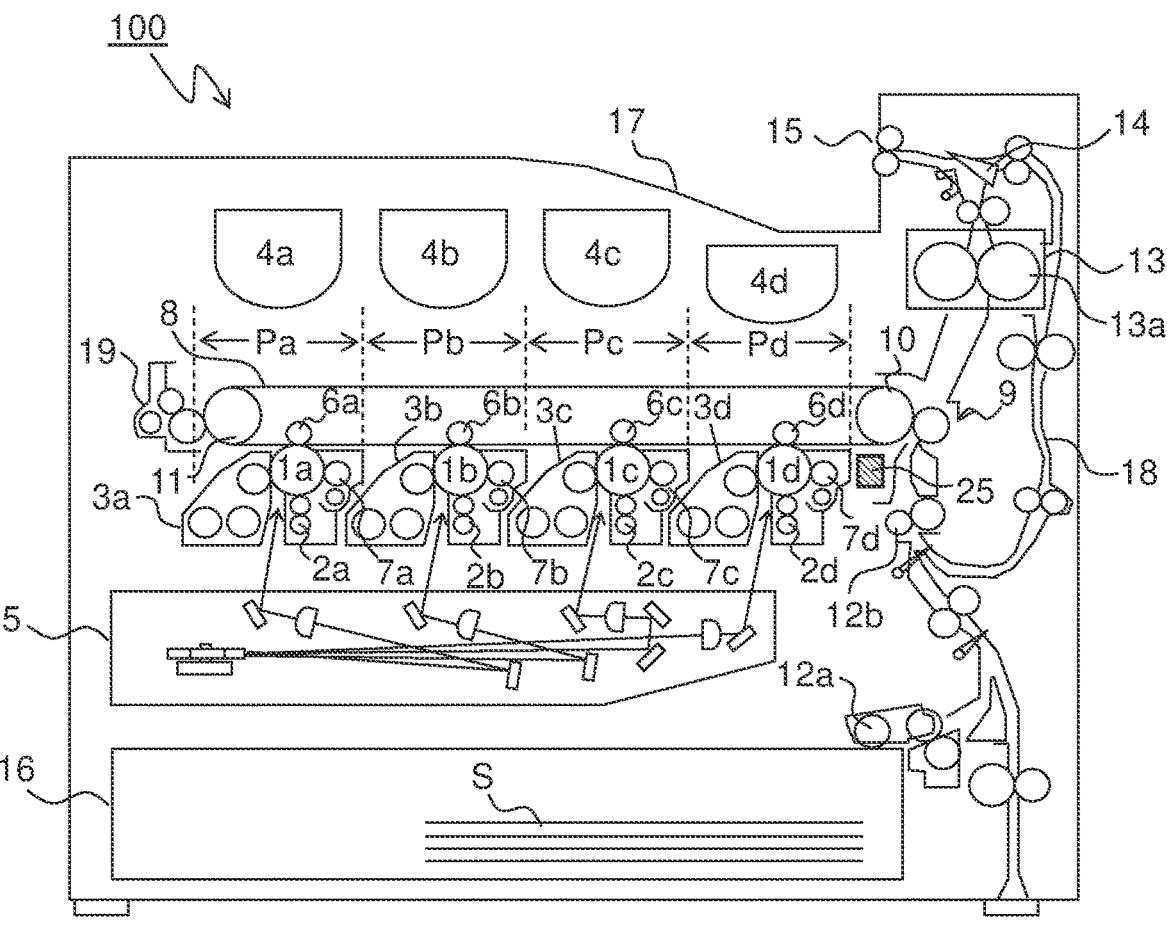
FIG. 1 is a schematic cross-sectional view illustrating an overall structure of an image forming apparatus equipped with an optical scanning device of the present disclosure.
Figure 2:
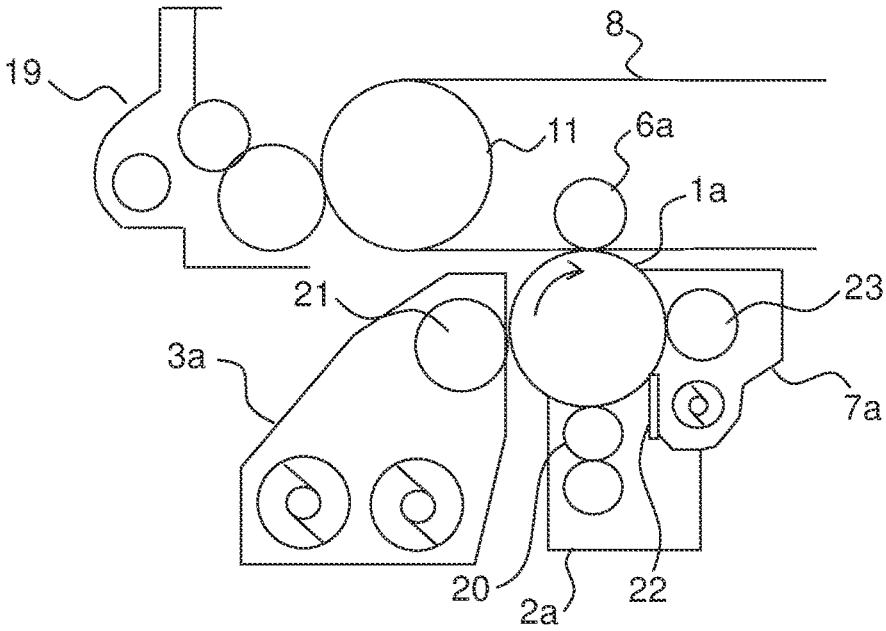
FIG. 2 is an enlarged view of an image forming unit and its vicinity in FIG. 1.

Hereinafter, with reference to the drawings, an embodiment of the present disclosure is described. FIG. 1 is a schematic cross-sectional view illustrating an overall structure of an image forming apparatus 100 equipped with an optical scanning device 5 of the present disclosure. FIG. 2 is an enlarged view of an image forming unit Pa and its vicinity in FIG. 1.

The image forming apparatus 100 illustrated in FIG. 1 is a so-called tandem type color printer, which has the following structure. In a main body of the image forming apparatus 100, there are four image forming units Pa, Pb, Pc, and Pd disposed in order from an upstream side in a conveying direction (from the left side in FIG. 1). These image forming units Pa to Pd are disposed corresponding to four different color images (yellow, magenta, cyan, and black images), and sequentially form yellow, magenta, cyan, and black images, respectively, by charging, exposing, developing, and transferring steps.

The image forming units Pa to Pd are respectively equipped with photosensitive drums 1a, 1b, 1c, and 1d, which carry visual images (toner images) of individual colors. Further, an intermediate transfer belt 8 that rotates in a counterclockwise direction in FIG. 1 is disposed adjacent to the image forming units Pa to Pd. The toner images formed on the photosensitive drums 1a to 1d are sequentially transferred onto the intermediate transfer belt 8 that rotates while contacting with the photosensitive drums 1a to 1d, and then are transferred onto a paper sheet S as an example of a recording medium, at one time by a secondary transfer roller 9. Furthermore, the toner images are fixed onto the paper sheet S in a fixing unit 13, and then the paper sheet S is discharged from the main body of the image forming apparatus 100. The photosensitive drums 1a to 1d are rotated in a clockwise direction in FIG. 1, while an image forming process is performed on each of the photosensitive drums 1a to 1d.

The paper sheet S to which the toner image is to be transferred is stored in a paper sheet cassette 16 disposed in a lower part of the main body of the image forming apparatus 100, and is conveyed to the secondary transfer roller 9 by a sheet feed roller 12a and a registration roller pair 12b. As the intermediate transfer belt 8, a seamless belt is mainly used.

Next, the image forming units Pa to Pd are described. Hereinafter, the image forming unit Pa is described in detail, and descriptions of the image forming units Pb to Pd are omitted, which have the basically same structure as the image forming unit Pa. As illustrated in FIG. 2, a charging device 2a, a developing device 3a, and a cleaning device 7a are disposed around the photosensitive drum 1a, along the drum rotation direction (the clockwise direction in FIG. 2), and a primary transfer roller 6a is disposed to sandwich the intermediate transfer belt 8 with the photosensitive drum 1a. In addition, on the upstream side of the photosensitive drum 1a in the rotation direction of the intermediate transfer belt 8, there is a belt cleaning unit 19 disposed to face a tension roller 11 via the intermediate transfer belt 8.

Next, an image forming procedure in the image forming apparatus 100 is described. When a user instructs to start image formation, a main motor 61 (see FIG. 6) first starts to rotate the photosensitive drums 1a to 1d, and charging rollers 20 of the charging devices 2a to 2d uniformly charge surfaces of the photosensitive drums 1a to 1d, respectively. Next, light beams (laser beams) emitted from the optical scanning device 5 irradiate the surfaces of the photosensitive drums 1a to 1d, so as to form electrostatic latent images on the photosensitive drums 1a to 1d corresponding to an image signal.

The developing devices 3a to 3d are filled with a predetermined amount of toner of yellow, magenta, cyan, and black colors, respectively. Note that when the ratio of toner in two-component developer filled in the developing device 3a to 3d becomes lower than a specified value due to toner image formation described later, the toner is replenished from a toner container 4a to 4d to the developing device 3a to 3d. The toner in the developer is supplied to the photosensitive drum 1a to 1d by a developing roller 21 of the developing device 3a to 3d, and electrostatically adheres to the same. In this way, the toner image is formed corresponding to the electrostatic latent image formed by exposure to the light from the optical scanning device 5.

Further, the primary transfer roller 6a to 6d applies an electric field of a predetermined transfer voltage between the primary transfer roller 6a to 6d and the photosensitive drum 1a to 1d, so that the toner image of yellow, magenta, cyan, or black color on the photosensitive drum 1a to 1d is primarily transferred onto the intermediate transfer belt 8. The images of four colors are formed with a predetermined positional relationship that is determined in advance for forming a predetermined full color image. After that, in preparation for subsequent formation of a new electrostatic latent image, the toner remaining on the surface of the photosensitive drum 1a to 1d is removed by a cleaning blade 22 and a rubbing roller 23 of the cleaning device 7a to 7d.

When a belt drive motor 63 (see FIG. 6) rotates a drive roller 10, the intermediate transfer belt 8 starts to rotate in the counterclockwise direction, and the paper sheet S is conveyed at a predetermined timing, from the registration roller pair 12b to the secondary transfer roller 9 disposed adjacent to the intermediate transfer belt 8, so that the full color image is transferred onto the paper sheet S. The paper sheet S onto which the toner image is transferred is conveyed to the fixing unit 13. The toner remaining on the surface of the intermediate transfer belt 8 is removed by the belt cleaning unit 19.

The paper sheet S conveyed to the fixing unit 13 is heated and pressed by a fixing roller pair 13a so that the toner image is fixed to a surface of the paper sheet S, and thus a predetermined full color image is formed. A conveying direction of the paper sheet S with the full color image formed is selected by a branch unit 14 that branches in a plurality of directions, so as to be discharged onto a discharge tray 17 by a discharge roller pair 15 as it is (or after being sent to a double-sided conveying path 18 and after being printed on both sides).

An image density sensor 25 is disposed at a position facing the drive roller 10 via the intermediate transfer belt 8. As the image density sensor 25, an optical sensor is used in general, which includes a light emitting element such as an LED and a light receiving element such as a photodiode. When measuring toner adhesion amount on the intermediate transfer belt 8, the light emitting element emits measuring light to each patch image (reference image) formed on the intermediate transfer belt 8, and the measuring light enters the light receiving element as light reflected by the toner and light reflected by the surface of the belt.

The reflected light from the toner and the reflected light from the surface of the belt each include specular reflection light and diffused reflection light. The specular reflection light and the diffused reflection light are separated by a polarized light separation prism and enter different light receiving elements, respectively. Each light receiving element performs photoelectric conversion of the received specular reflection light or diffused reflection light, and outputs its output signal to a control unit 90 (see FIG. 6).

Then, image density (toner amount) and image position of the patch image are detected from characteristic changes of the output signals of the specular reflection light and the diffused reflection light, and they are compared with predetermined reference density and reference position, so as to adjust a characteristic value of a development voltage, exposure start position and timing of the optical scanning device 5, and the like. Thus, density correction and color shift correction (calibration) is performed for each color.

Figure 3:
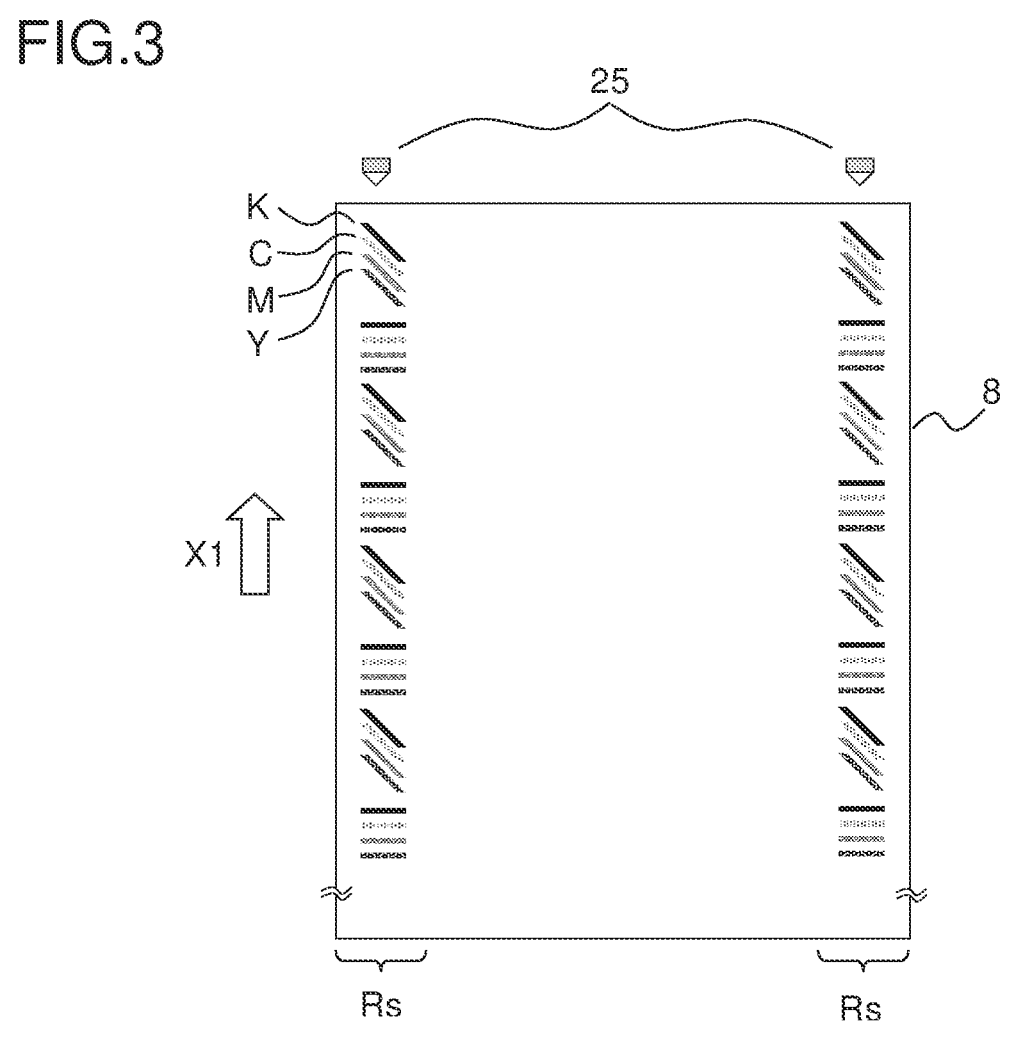

FIG. 3 is a diagram illustrating an example of the patch image (reference image) for color shift correction, which is used for calibration. In reference image forming regions Rs on both ends of the intermediate transfer belt 8 in its width direction, there are formed reference images Y, M, C, and K including diagonal and horizontal lines of yellow, magenta, cyan, and black colors. Note that an arrow X1 indicates a belt moving direction. The pattern of the reference images Y to K illustrated in FIG. 3 is a common one, and color shift in the main scanning direction (belt width direction) is detected using the diagonal and horizontal lines of each color, while color shift in the sub-scanning direction (belt circumferential direction) is detected from the distance between the horizontal lines of each color.

In addition, as the reference images Y to K are formed in the same pattern on both ends in the main scanning direction (in the belt width direction), main scan equal magnification and scanning inclination can be detected. Furthermore, in order to decrease detection fluctuation of the color shift in the belt circumferential direction, the reference images Y to K are formed repeatedly in the sub-scanning direction, so as to calculate the average value of shift amounts obtained by measuring the same pattern a plurality of times.

The positional relationship of the diagonal and horizontal lines of each color is detected by the image density sensor 25 and is compared with the predetermined reference position, and when correcting the color shift in the main scanning direction, the exposure start position of the optical scanning device 5 is adjusted, and when correcting the color shift in the sub-scanning direction, scan start timing of the optical scanning device 5 is adjusted, and thus the color shift correction is performed for each color. When correcting the scanning inclination, it is performed to adjust an angle of a plane mirror 49c closest to the photosensitive drum 1a to 1c, or a plane mirror 49a closest to the photosensitive drum 1d, in the optical scanning device 5 (see FIG. 4).

[2. Structure of Optical Scanning Device]

Figure 4:
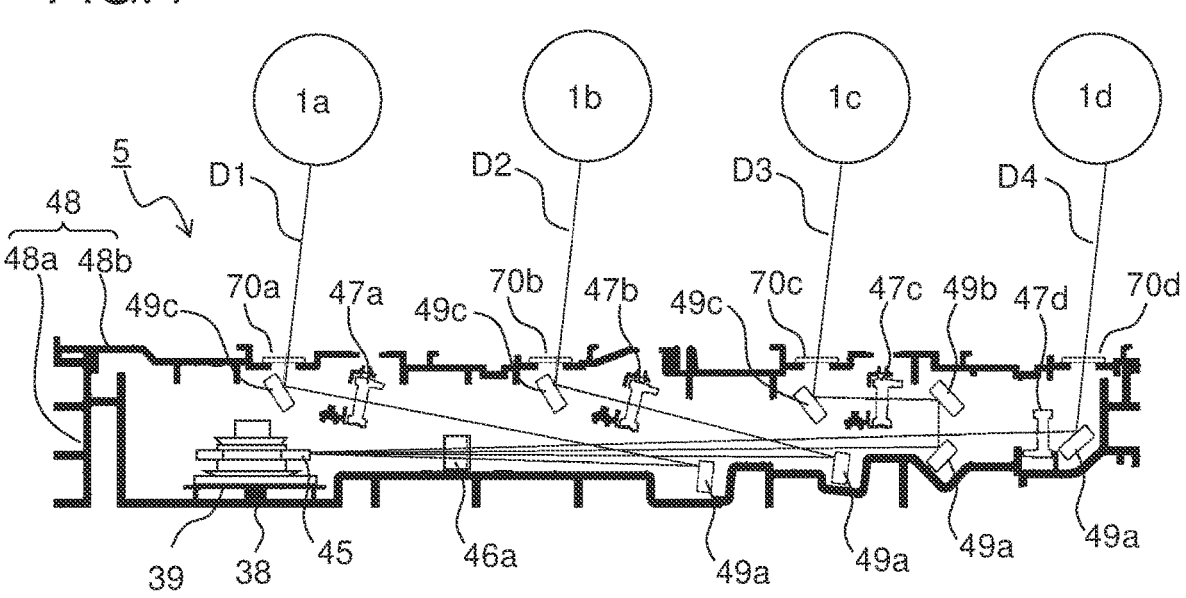
FIG. 4 is a cross-sectional side view illustrating an internal structure of the optical scanning device according to an embodiment of the present disclosure.

Next, the optical scanning device 5 is described. FIG. 4 is a cross-sectional side view illustrating an internal structure of the optical scanning device 5 according to an embodiment of the present disclosure. As illustrated in FIG. 4, the optical scanning device 5 has a housing 48. The housing 48 includes a main body part 48a and a lid part 48b. A polygon mirror 45 is disposed on a bottom surface of the main body part 48a. In this embodiment, the polygon mirror 45 is a rotating polygon mirror of a regular polygon shape, which has a plurality of deflection surfaces (reflection surfaces) on its side faces, and is driven by a polygon motor 38 to rotate at a predetermined speed. The polygon motor 38 is fixed to a motor support plate 39, which is fixed to the bottom surface of the main body part 48a.

Inside the housing 48, there are disposed a laser beam source, a collimator lens, an aperture, a cylindrical lens (which are not shown), a first scanning lens 46a, second scanning lenses 47a to 47d, and plane mirrors 49a to 49c. The first scanning lens 46a and the second scanning lenses 47a to 47d have fθ characteristics, so as to image laser beams D1 to D4 deflected and reflected by the polygon mirror 45 on the photosensitive drums 1a to 1d, respectively. In addition, the plane mirrors 49a to 49c are disposed on optical paths of the laser beams D1 to D4 from the polygon mirror 45 to the photosensitive drums 1a to 1d, respectively.

The scanning operation with the laser beams D1 and D2 by the optical scanning device 5 having the structure described above is described. First, the laser beams D1 and D2 emitted from the laser beam source are made substantially parallel light beams by the collimator lens and are made to have a predetermined optical path width by the aperture. Next, the laser beams D1 and D2 as the substantially parallel light beams are made to enter the cylindrical lens. The laser beams D1 and D2 entering the cylindrical lens maintain the parallel light beam state in a main scan cross section, but are converged in the sub-scanning direction to be ejected, and are imaged as line images on the deflection surface of the polygon mirror 45. At this time, for easy separation of the optical paths of the two laser beams D1 and D2 deflected by the polygon mirror 45, the laser beams D1 and D2 enter the deflection surface at different angles in the sub-scanning direction.

The laser beams D1 and D2 entering the polygon mirror 45 are deflected at a constant angular velocity by the polygon mirror 45, and then are deflected at a constant velocity by the first scanning lens 46a. The laser beams D1 and D2 after passing through the first scanning lens 46a are reflected by the plane mirrors 49a disposed in the respective optical paths. Then, the laser beam D1 enters the second scanning lens 47a, while the laser beam D2 enters the second scanning lens 47b, and they are deflected at a constant velocity by the second scanning lenses 47a and 47b, respectively. Further, the laser beams D1 and D2 deflected at a constant velocity are reflected by the final plane mirrors 49c disposed in the respective optical paths, and are distributed to the photosensitive drums 1a and 1b, respectively, through windows 70a and 70b formed in the lid part 48b that covers the opening of the main body part 48a.

In the same manner, the laser beams D3 and D4 emitted from the laser beam source pass through the collimator lens, the aperture and the cylindrical lens, and then are deflected at a constant angular velocity by the polygon mirror 45, and then are deflected at a constant velocity by the first scanning lens 46a. The laser beam D3 after passing through the first scanning lens 46a is reflected two times by the plane mirrors 49a and 49b disposed in the optical path, and then enters the second scanning lens 47c, while the laser beam D4 after passing through the first scanning lens 46a enters the second scanning lens 47d, and they are deflected at a constant velocity. Furthermore, the laser beam D3 is reflected by the final plane mirror 49c, while the laser beam D4 is reflected by the plane mirror 49a, and they are distributed to the photosensitive drums 1c and 1d, respectively through windows 70c and 70d formed in the lid part 48b.

The polygon mirror 45, the first scanning lens 46a, the second scanning lenses 47a to 47d, and the plane mirrors 49a to 49c constitute a scanning optical system that scans the photosensitive drums 1a to 1d with the laser beams D1 to D4, respectively.

Figure 5:
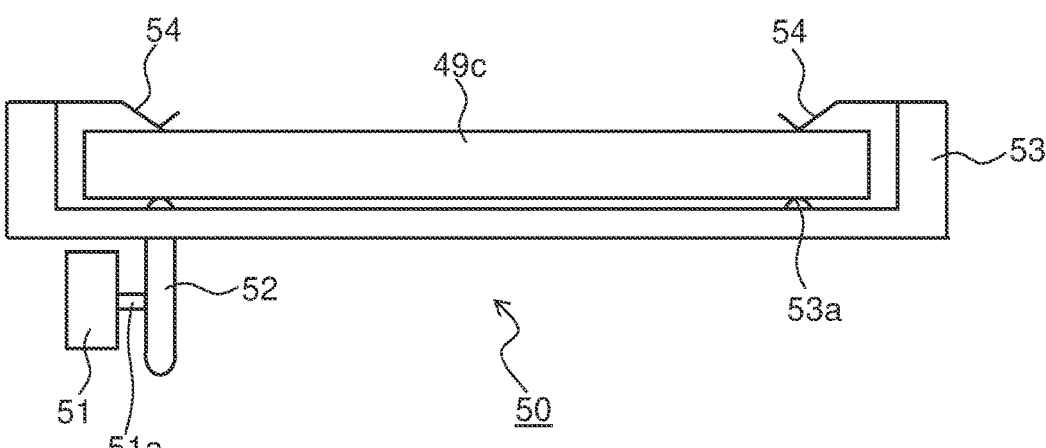
FIG. 5 is a diagram schematically illustrating a skew adjustment mechanism.

FIG. 5 is a diagram that schematically illustrates a skew adjustment mechanism 50 for adjusting a skew of the plane mirror 49c. The skew adjustment mechanism 50 adjusts position of the plane mirror 49c in the optical scanning device 5, so as to adjust scanning inclination (skew) of the laser beam D1 to D3 (see FIG. 4). The skew adjustment mechanism 50 is constituted of a skew adjustment motor 51 and an eccentric cam 52.

The plane mirror 49c is held by a mirror holder 53 in the optical scanning device 5. The mirror holder is provided with a pair of leaf springs 54. The pair of leaf springs 54 respectively thrust one end side and the other end side of the plane mirror 49c in its longitudinal direction toward the mirror holder 53.

The one end side of the plane mirror 49c in the longitudinal direction (the right end side in FIG. 5) is pressed by the leaf spring 54 to contact a protrusion 53a of the mirror holder 53. The other end side of the plane mirror 49c in the longitudinal direction (the left end side of FIG. 5) is pressed by the leaf spring 54 to contact an outer circumferential surface of the eccentric cam 52.

In the skew adjustment mechanism 50, the skew adjustment motor 51 is disposed sideways, and the eccentric cam 52 is fixed to an output shaft 51a of the skew adjustment motor 51. When the skew adjustment motor 51 rotates, the eccentric cam 52 fixed to the output shaft 51a also rotates, and hence a protruding amount of the eccentric cam 52 with respect to the mirror holder 53 changes. As a result, the other end side of the plane mirror 49c in the longitudinal direction swings and moves in the up and down direction with respect to the protrusion 53a as a pivot point. The skew adjustment motor 51 is a stepping motor whose rotation direction and rotation amount (rotation angle) can be accurately controlled by pulse control.

According to this structure, by sending a pulse signal from the control unit 90 (see FIG. 6) so as to control the rotation amount (rotation angle) of the skew adjustment motor 51, the protruding amount of the eccentric cam 52 with respect to the mirror holder 53 can be controlled, and the skew of the plane mirror 49c can be accurately adjusted. Note that the skew adjustment mechanism 50 for adjusting the scanning inclination (skew) of the laser beam D4 also has the same structure as illustrated in FIG. 5, except for adjusting the position of the plane mirror 49a instead of the plane mirror 49c. However, in the case where a reference color is used as a reference to measure a difference of a skew amount between multicolor and the reference color as the skew amount, it is not necessary to perform angle adjustment of the plane mirror for the reference color, and the plane mirror is not required to have the skew adjustment mechanism 50. For instance, the laser beam of the reference color is D4, it is not necessary to provide the skew adjustment mechanism 50 to the plane mirror 49a.

[3. Control Path of Image Forming Apparatus]

Figure 6:
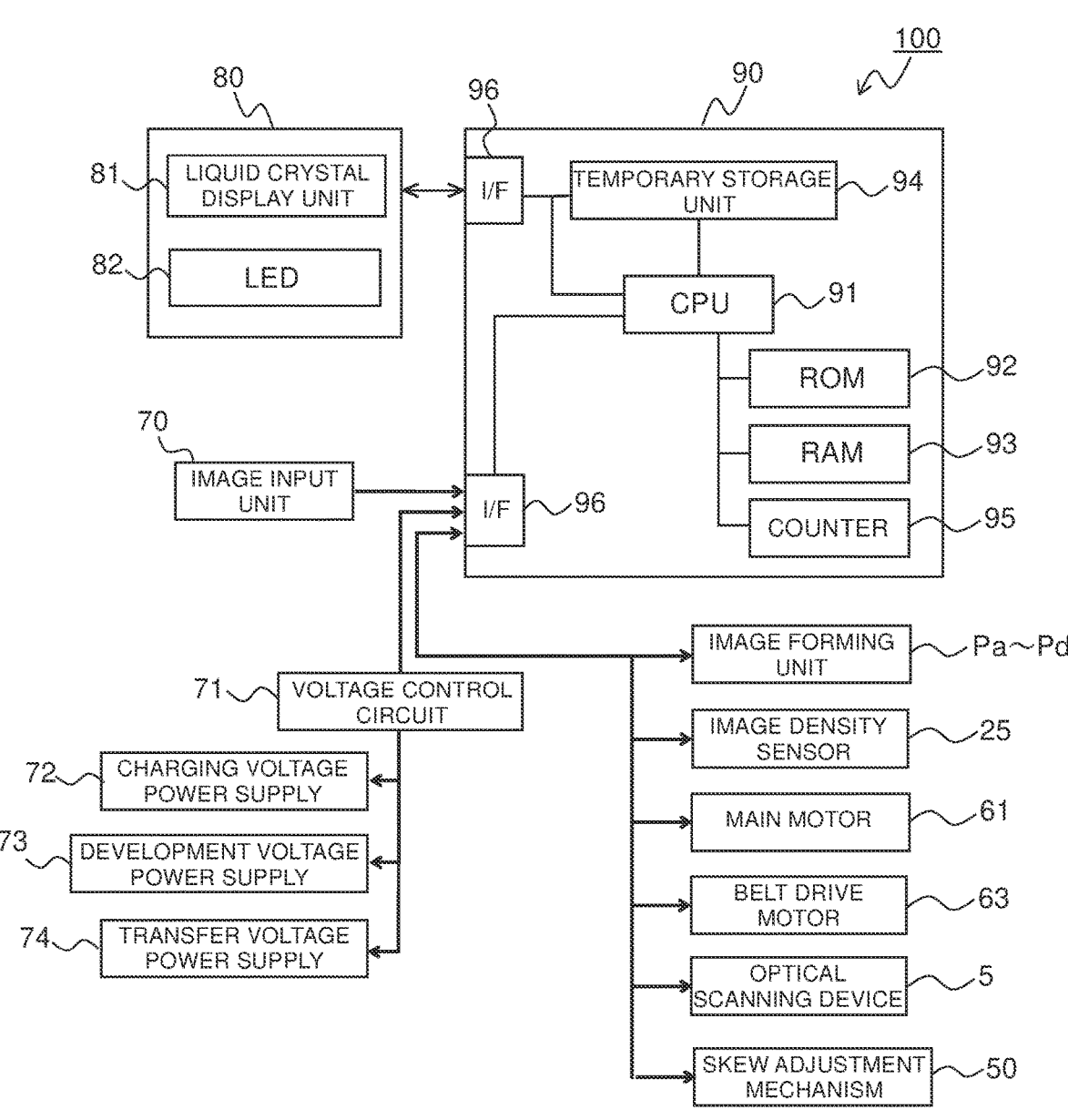
FIG. 6 is a block diagram illustrating an example of a control path of the image forming apparatus.

FIG. 6 is a block diagram illustrating an example of a control path of the image forming apparatus 100. Note that when using the image forming apparatus 100, various controls of individual sections in the apparatus are performed, and hence the control path of the entire image forming apparatus 100 is complicated. Therefore, in this description, a part of the control path, which is necessary for implementing the present disclosure is mainly described.

The control unit 90 includes at least a central processing unit (CPU) 91, a read only memory (ROM) 92 that is a storage unit dedicated to reading, a random access memory (RAM) 93 that is a readable and writable storage unit, a temporary storage unit 94 that temporarily stores image data and the like, a counter 95, and a plurality of (e.g. two) interfaces (I/Fs) 96 for sending control signals to individual devices in the image forming apparatus 100 and for receiving input signals from an operation unit 80. In addition, the control unit 90 can be disposed at any location in the main body of the image forming apparatus 100.

The ROM 92 stores data or the like that is not changed during use of the image forming apparatus 100, such as a control program for the image forming apparatus 100, numeric values or the like necessary for control, and the like. The RAM 93 stores necessary data generated during control of the image forming apparatus 100, data temporarily necessary for control of the image forming apparatus 100, and the like. In addition, the RAM 93 (or the ROM 92) also stores a density correction table or the like that is used for calibration. The counter 95 accumulates and counts the number of printed sheets.

In addition, the control unit 90 sends control signals from the CPU 91 via the I/F 96 to individual sections and devices in the image forming apparatus 100. In addition, the individual sections and devices send signals indicating their states or input signals to the CPU 91 via the I/F 96. The individual sections and devices controlled by the control unit 90 include, for example, the image forming units Pa to Pd, the secondary transfer roller 9, a roller contact and separation mechanism 35, the skew adjustment mechanism 50, the main motor 61, the belt drive motor 63, an image input unit 70, a voltage control circuit 71, the operation unit 80, and the like.

The image input unit 70 is a reception unit that receives image data sent to the image forming apparatus 100 from a host apparatus such as a personal computer. The image signal input from the image input unit 70 is converted into a digital signal, and then sent out to the temporary storage unit 94.

The voltage control circuit 71 is connected to a charging voltage power supply 72, a development voltage power supply 73, and a transfer voltage power supply 74, so that an output signal from the control unit 90 makes each of the power supplies work. When each power supply receives a control signal from the voltage control circuit 71, the charging voltage power supply 72 applies a predetermined voltage to the charging roller 20 in the charging devices 2a to 2d, the development voltage power supply 73 applies a predetermined voltage to the developing roller 21 in the developing devices 3a to 3d, and the transfer voltage power supply 74 applies a predetermined voltage to the primary transfer rollers 6a to 6d and the secondary transfer roller 9.

The operation unit 80 is provided with a liquid crystal display unit 81, and LEDs 82 for indicating various states, and the user operates a stop/clear button of the operation unit 80 to stop image formation, or operates a reset button to reset various settings of the image forming apparatus 100 to a default state. The liquid crystal display unit 81 displays states of the image forming apparatus 100, or displays image formation status or the number of copies to be printed. The various settings of the image forming apparatus 100 are made via a printer driver of the personal computer.

[4. Calculation of Reference Position of Plane Mirror in Optical Scanning Device]

Figure 7:
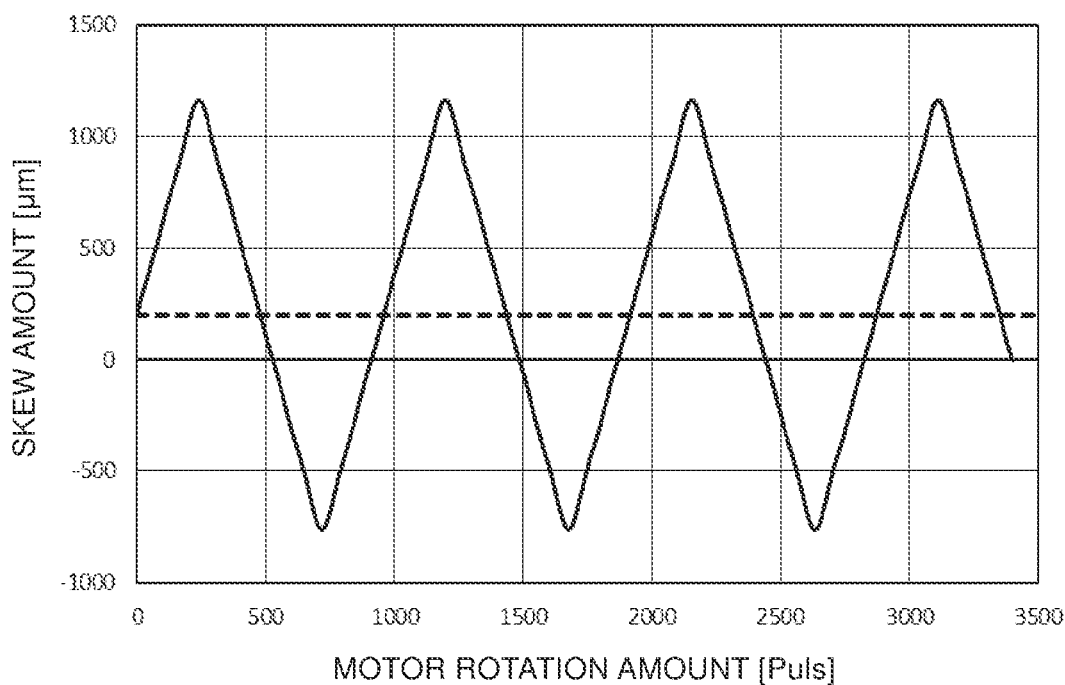
FIG. 7 is a graph illustrating a relationship between a skew amount of the reference image on an intermediate transfer belt and the number of drive pulses of a skew adjustment motor.

Next, a method of calculating the reference position (home position) of the plane mirror 49c is described in detail. FIG. 7 is a graph illustrating a relationship between a skew amount of the reference image on the intermediate transfer belt 8 and the number of drive pulses of the skew adjustment motor 51, in which the vertical axis represents the skew amount, and the horizontal axis represents the number of drive pulses.

In the skew adjustment mechanism 50 illustrated in FIG. 5, when the skew adjustment motor 51 rotates, the eccentric cam 52 rotates so that the angle of the plane mirror 49c is periodically changed, corresponding to the rotation amount (rotation angle) of the eccentric cam 52. In addition, the skew amount with respect to the number of drive pulses is also periodically changed corresponding to the rotation amount (rotation angle) of the eccentric cam 52. Therefore, the skew amount of the reference image and the number of drive pulses of the skew adjustment motor 51 have the relationship illustrated in FIG. 7.

As illustrated in FIG. 7, the skew amount of the plane mirror 49c is periodically changed with respect to the drive pulse. In addition, when the skew adjustment motor 51 is rotated by a rotation amount corresponding to a half period of position change of the plane mirror 49c from an arbitrary position of the plane mirror 49c, average value of the position change of the plane mirror 49c before and after rotating the skew adjustment motor 51 is substantially the same as average value of the position change of the plane mirror 49c per one period. In this embodiment, the above characteristics is used to calculate the reference position of the plane mirror 49c.

Note that the reference position includes two cases. One is the case where it exists in the interval in which the skew amount decreases with respect to the rotation direction of the skew adjustment motor 51 (positive rotation direction), and the other is the case where it exists in the interval in which the skew amount increases with respect to the same. Further, depending on the interval in which the reference position exists, the displacement direction of the plane mirror 49c when the skew adjustment motor 51 is positively rotated is changed. Specifically, with respect to the rotation direction of the skew adjustment motor 51 (increasing direction of the drive pulse), if the reference position exists in the interval in which the skew amount increases (ascending gradient), the rotation of the skew adjustment motor 51 displaces the plane mirror 49c in the positive direction. In contrast, if the reference position exists in the interval in which the skew amount decreases (descending gradient), the rotation of the skew adjustment motor 51 displaces the plane mirror 49c in the negative direction.

In the case of correcting the skew of the plane mirror 49c, it is necessary to determine in advance whether the plane mirror 49c is displaced in the positive direction or in the negative direction, when the skew adjustment motor 51 starts to rotate, and hence if the reference position is returned to the interval having the opposite gradient, the skew adjustment by the skew adjustment mechanism 50 is performed in the opposite direction. In the following description, the case where the plane mirror 49c corresponding to a yellow image is returned to the reference position in the interval in which the skew amount decreases, and the case where it is returned to the reference position in the interval in which the skew amount increases are separately described.

(4-1. Adjusting Method When Returning to Reference Position in Interval in Which Skew Amount Decreases)

Figure 8:
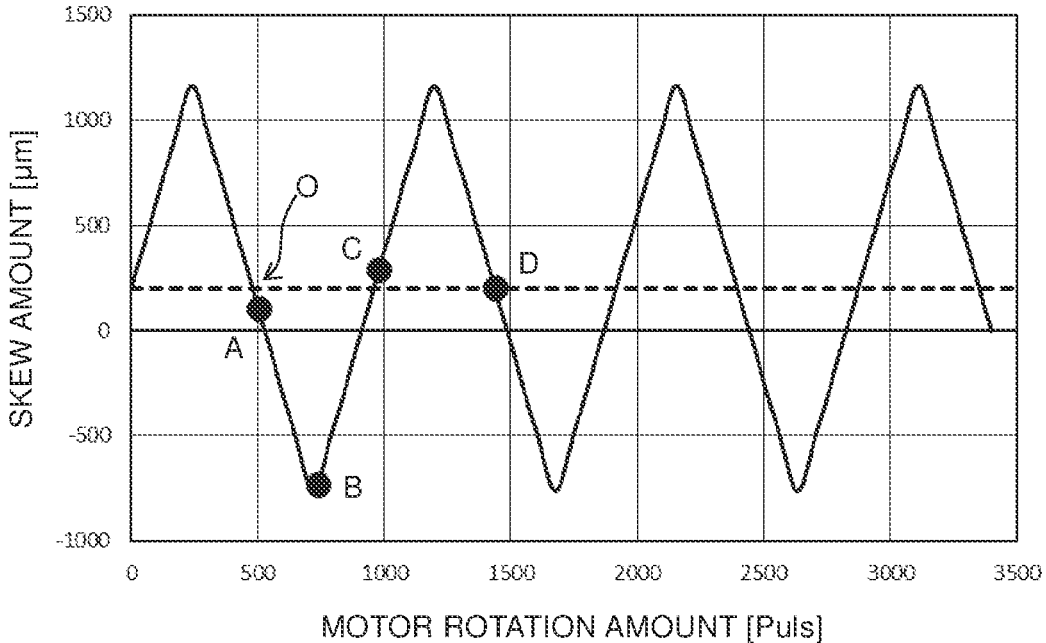
FIG. 8 is a diagram illustrating a control example of a first reference position adjustment for returning a reference position to an interval in which the skew amount decreases with respect to a rotation direction of the skew adjustment motor, in the case where SkewB<SkewA_C holds.
Figure 9:
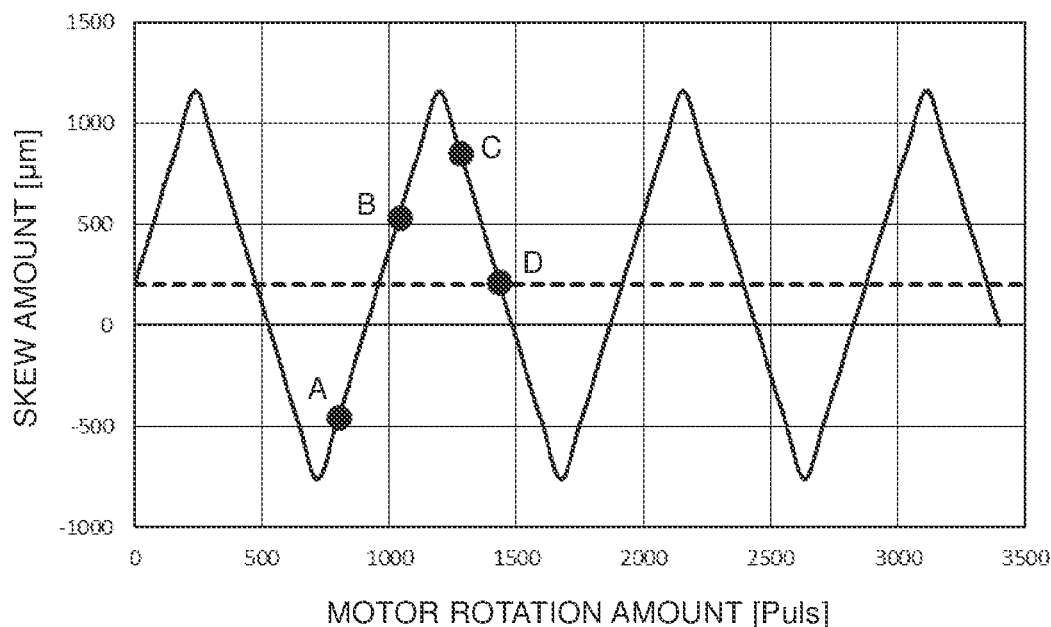
FIG. 9 is a diagram illustrating a control example of the first reference position adjustment, in the case where SkewB≥SkewA_C hold.

First, the case when returning to the reference position in the interval in which the skew amount decreases with respect to the rotation direction of the skew adjustment motor 51 (first reference position adjustment) is described. FIGS. 8 and 9 are diagrams illustrating a control example of the first reference position adjustment, when returning the reference position to the interval in which the skew amount decreases with respect to the rotation direction of the skew adjustment motor 51.

In FIGS. 8 and 9, the state where the skew amount of the plane mirror 49c is a predetermined value (200 μm) is the reference position (intersection O of a graph and a broken line). After that, it is supposed that power supply is turned off repeatedly during transmission of the drive pulse from the control unit 90 so that positional displacement is accumulated, and that the plane mirror 49c is actually at point A position though the control unit 90 recognizes it is at the reference position (point O).

First, in the state where the plane mirror 49c is at the point A position, the reference image (see FIG. 3) for color shift detection is formed on the intermediate transfer belt 8. Then, the skew amount is measured, which is referred to as SkewA. Next, the skew adjustment motor 51 is driven by the number of drive pulses corresponding to ½ of a half period of a skew amount change of the plane mirror 49c. In the example of FIGS. 8 and 9, the half period corresponds to 478 pulses, and hence the skew adjustment motor 51 is driven by 239 pulses corresponding to ½ of 478 pulses. As a result, the plane mirror 49c moves to the state of point B.

Next, also at the point B, the reference image is formed on the intermediate transfer belt 8, and the skew amount is measured, which is referred to as SkewB. Similarly, the skew adjustment motor 51 is further driven by 239 pulses, and the plane mirror 49c moves to the state of point C. Also at the point C, the reference image is formed on the intermediate transfer belt 8, and the skew amount is measured, which is referred to as SkewC. On the basis of the measured skew amounts at the point A, the point B, and the point C, the number of drive pulses for returning from the point C to point D, which is the same state as the reference position, is calculated as follows.

First, the average value of the skew amounts at the point A and at the point C, i.e., SkewA_C=(SkewA+SkewC)/2 is calculated. Next, a large or small relationship between SkewB and SkewA_C is checked. In the case of FIG. 8 where SkewB<SkewA_C holds (Pattern 1), the skew amount at the point C with respect to a predetermined value of the skew amount of the plane mirror 49c is (SkewC−SkewA)/2. In order to move from the point C to intersection of straight line BC and the broken line, it is necessary to negatively rotate the skew adjustment motor 51. Therefore, the skew adjustment motor 51 is driven by a first rotation amount, which corresponds to the number of drive pulses necessary for moving the position of the plane mirror 49c by −(SkewC−SkewA)/2=(SkewA−SkewC)/2, and it is moved from the point C to the intersection of the straight line BC and the broken line. However, this point is the reference position in the interval in which the skew amount increases, and hence it is necessary to move to the point D that is the reference position in the interval in which the skew amount decreases.

Therefore, the number of drive pulses of the skew adjustment motor 51 corresponding to the half period of the skew amount change of the plane mirror 49c is referred to as a second rotation amount. Then, the skew adjustment motor 51 is rotated by the rotation amount obtained by adding the second rotation amount to the first rotation amount. In this way, as illustrated in FIG. 8, it is moved from the intersection of the straight line BC and the broken line to the point D, which is the reference position in the interval in which the skew amount decreases.

A calculation example of the reference position of the plane mirror 49c using specific values is described below. The following calculation is performed for the plane mirror 49c, which is closest to the photosensitive drum 1a that forms a yellow image. In FIG. 8, the coordinates of the point A is supposed to be (500, 107.34), the coordinates of the point B is supposed to be (739, −727.01), and the coordinates of the point C is supposed to be (978, 289.13).

SkewA_C=(107.34+289.13)/2=198.24 holds, and SkewB (=−727.01)<SkewA_C(=198.24) holds, and hence this corresponds to the Pattern 1 described above. The skew amount at the point C with respect to the predetermined value of the skew amount of the plane mirror $49c$ is (SkewC−SkewA)/2=(289.13−107.34)/2=90.895 (μm).

In the example illustrated in FIG. 8, the skew adjustment mechanism 50 changes the skew amount of the plane mirror $49c$ by 4.235 (μm) per one drive pulse of the skew adjustment motor 51. Therefore, the first rotation amount is −90.895/4.235≈−21 (pulses). In addition, as the second rotation amount is 478 (pulses), the first rotation amount plus the second rotation amount is −21+478=459 (pulses).

After moving from the point C, the plane mirror $49c$ must be at the point D position, which is 978+459=1437 (pulses) position. The position whose number of drive pulses is 1437 is a position close to a desired yellow reference value, and thus the plane mirror $49c$ can be returned to the reference position.

In the case of FIG. 9 where SkewB≥SkewA_C holds (Pattern 2), the skew amount at the point C with respect to the predetermined value of the skew amount of the plane mirror $49c$ is (SkewC−SkewA)/2. In order to move to the point D, the skew adjustment motor 51 should be positively rotated. The skew adjustment motor 51 is driven by a third rotation amount, which corresponds to the number of drive pulses necessary for moving the position of the plane mirror $49c$ by (SkewC−SkewA)/2. By the operation described above, the plane mirror $49c$ can be returned to the reference position D in the interval in which the skew amount decreases.

A calculation example of the reference position of the plane mirror $49c$ using specific values is described below. In FIG. 9, the coordinates of the point A is supposed to be (800, −454.05), the coordinates of the point B is supposed to be (1039, 537.5), and the coordinates of the point C is supposed to be (1278, 857.35).

SkewA_C=(−454.05+857.35)/2=201.65 holds, and SkewB (=537.5)≥SkewA_C(=201.65) holds, and hence this corresponds to the Pattern 2 described above. The skew amount at the point C with respect to the predetermined value of the skew amount of the plane mirror $49c$ is (SkewC−SkewA)/2=(857.35−(−454.05))/2=655.7 (μm).

In the example illustrated in FIG. 9, the skew adjustment mechanism 50 changes the skew amount by 4.235 (μm) per one drive pulse of the skew adjustment motor 51. Therefore, the third rotation amount is 655.7 (μm)/4.235 (μm)≈155 (pulses). After moving from the point C, the plane mirror $49c$ must be at the point D position, which is 1278+155=1433 (pulses) position. The position whose number of drive pulses is 1433 is a position close to a desired yellow reference value, and thus the plane mirror $49c$ can be returned to the reference position D.

(4-2. Adjusting Method when Returning to Reference Position in Interval in which Skew Amount Increases)

Figure 10:
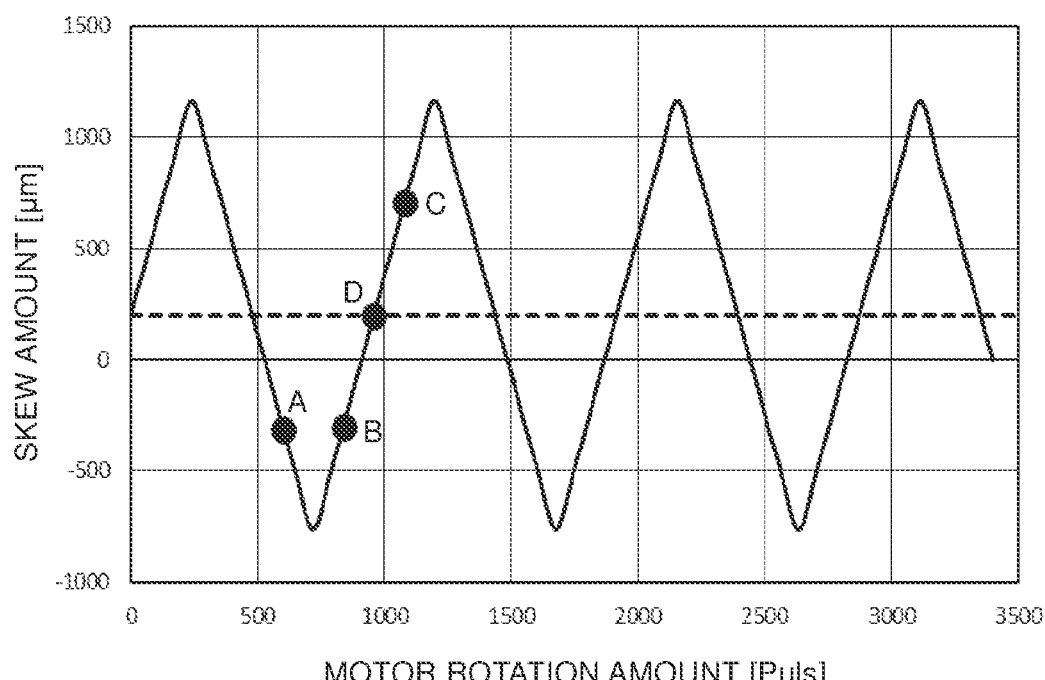
FIG. 10 is a diagram illustrating a control example of a second reference position adjustment for returning the reference position to an interval in which the skew amount increases with respect to the rotation direction of the skew adjustment motor, in the case where SkewB<SkewA_C holds.
Figure 11:
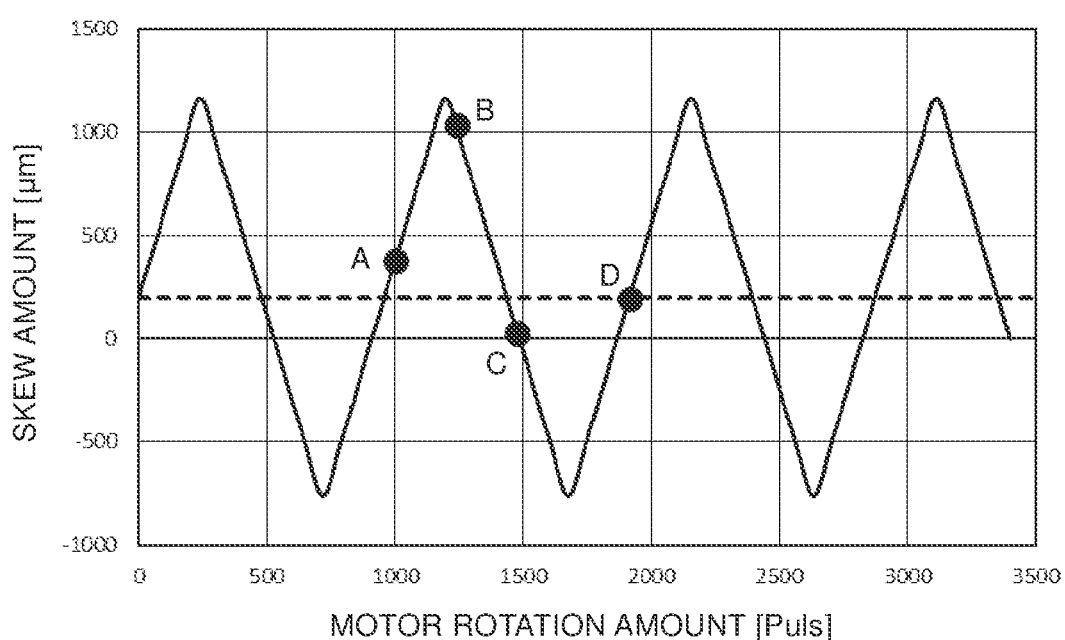
FIG. 11 is a diagram illustrating a control example of the second reference position adjustment, in the case where SkewB≥SkewA_C holds.

Next, the case when returning to the reference position in the interval in which the skew amount increases with respect to the rotation direction of the skew adjustment motor 51 (second reference position adjustment) is described. FIGS. 10 and 11 are diagrams illustrating a control example of the second reference position adjustment, when returning the reference position to the interval in which the skew amount increases with respect to the rotation direction of the skew adjustment motor 51.

The step of forming the reference image (see FIG. 3) for color shift detection on the intermediate transfer belt 8, in the states where the plane mirror $49c$ at the positions of the points A, B, and C, the step of measuring SkewA, SkewB, and SkewC, the step of calculating the average value of the skew amounts at the point A and at the point C, i.e., SkewA_C=(SkewA+SkewC)/2, and checking a large or small relationship between SkewB and SkewA_C are the same as those described above in the first reference position adjustment with reference to FIGS. 8 and 9.

In the case of FIG. 10 where SkewB<SkewA_C holds (Pattern 1), the skew amount at the point C with respect to the predetermined value of the skew amount of the plane mirror $49c$ is (SkewC−SkewA)/2. In order to move from the point C to the point D, the skew adjustment motor 51 should be positively rotated. Therefore, the skew adjustment motor 51 is driven by the first rotation amount, which corresponds to the number of drive pulses necessary for moving the position of the plane mirror $49c$ by −(SkewC−SkewA)/2=(SkewA−SkewC)/2. By performing the operation described above, the plane mirror $49c$ can be returned to the reference position D in the interval in which the skew amount increases.

A calculation example of the reference position of the plane mirror $49c$ using specific values is described below. In FIG. 10, the coordinates of the point A is supposed to be (600, −313.08), the coordinates of the point B is supposed to be (839, −302.67), and the coordinates of the point C is supposed to be (1078, 709.64).

SkewA_C=(−313.08+709.64)/2=198.28 holds, and SkewB(=−302.67)<SkewA_C(=198.28) holds, and hence this corresponds to the Pattern 1 described above. The skew amount at the point C with respect to the predetermined value of the skew amount of the plane mirror $49c$ is (SkewC−SkewA)/2=(709.64−(−313.08))/2=511.36 (μm).

In the example illustrated in FIG. 10, the skew adjustment mechanism 50 changes the skew amount by 4.235 (μm) per one drive pulse of the skew adjustment motor 51. Therefore, the first rotation amount is −511.36/4.235≈−121 (pulses).

After moving from the point C, the plane mirror $49c$ must be at the point D position, which is 1078−121=957 (pulses) position. The position whose number of drive pulses is 957 is a position close to a desired yellow reference value, and thus the plane mirror $49c$ can be returned to the reference position D.

In the case of FIG. 11 where SkewB≥SkewA_C holds (Pattern 2), the skew amount of the plane mirror $49c$ is (SkewC−SkewA)/2. In order to move from the point C to the intersection of the straight line BC and the broken line, it is necessary to negatively rotate the skew adjustment motor 51. Therefore, the skew adjustment motor 51 is driven by the third rotation amount, which corresponds to the number of drive pulses necessary for moving the position of the plane mirror $49c$ by (SkewC−SkewA)/2, and it moves from the point C to the intersection of the straight line BC and the broken line. However, this point is the reference position in the interval in which the skew amount decreases, and hence it is necessary to move to the point D that is the reference position in the interval in which the skew amount increases.

Therefore, the skew adjustment motor 51 is rotated by the rotation amount obtained by adding the second rotation amount to the third rotation amount. In this way, as illustrated in FIG. 11, it is moved from the intersection of the straight line BC and the broken line to the point D, which is the reference position in the interval in which the skew amount increases.

A calculation example of the reference position of the plane mirror $49c$ using specific values is described below. In FIG. 11, the coordinates of the point A is supposed to be (1000, 378.69), the coordinates of the point B is supposed to be (1239, 1036.72), and the coordinates of the point C is supposed to be (1478, 24.58).

SkewA_C=(378.69+24.58)/2=390.64 holds, and SkewB (=1036.72)≥SkewA_C(=390.64) holds, and hence this corresponds to the Pattern 2 described above. The skew amount at the point C with respect to the predetermined value of the skew amount of the plane mirror 49c is (SkewC−SkewA)/2=(24.58−378.69)/2=−177.06 (μm). In order to move from the point C to the intersection of the straight line BC and the broken line, it is necessary to negatively rotate the skew adjustment motor 51.

In the example illustrated in FIG. 11, the skew adjustment mechanism 50 changes the skew amount by 4.235 (μm) per one drive pulse of the skew adjustment motor 51. Therefore, the third rotation amount is −177.06 (μm)/4.235 (μm)≈−42 (pulses). In addition, as the second rotation amount is 478 (pulses), the third rotation amount plus the second rotation amount is −42+478=436 (pulses).

After moving from the point C, the plane mirror 49c must be at the point D position, which is 1478+436=1914 (pulses) position. The position whose number of drive pulses is 1914 is a position close to a desired yellow reference value, and thus the plane mirror 49c can be returned to the reference position.

(4-3. Rotation Amount Decreasing Control of Skew Adjustment Motor)

In the first reference position adjustment and the second reference position adjustment described above, if the number of drive pulses of the skew adjustment motor 51 for returning the second plane mirror 49c to the reference position, which is the sum of the first rotation amount and the second rotation amount in the first reference position adjustment, or the sum of the third rotation amount and the second rotation amount in the second reference position adjustment, is more than the number of drive pulses corresponding to the half period of the skew amount change of the plane mirror 49c, the rotation amount of the skew adjustment motor 51 can be decreased. Hereinafter, a rotation amount decreasing control of the skew adjustment motor is described in detail.

Figure 12:
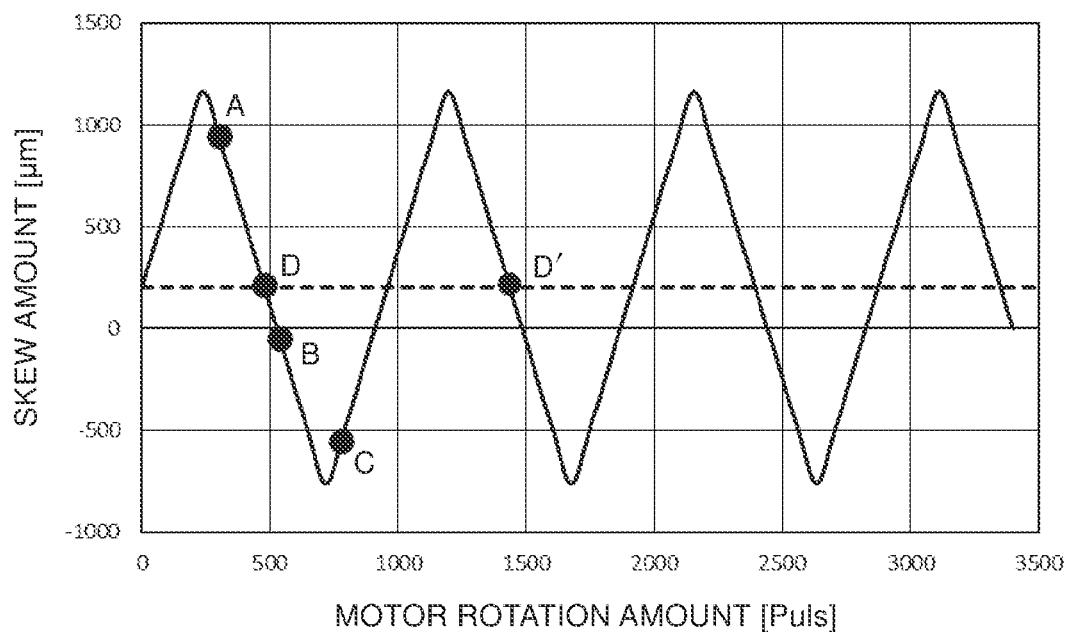
FIG. 12 is a diagram illustrating a rotation amount decreasing control of the skew adjustment motor in the first reference position adjustment.

First, the case when returning to the reference position in the interval in which the skew amount decreases with respect to the rotation direction of the skew adjustment motor 51 (first reference position adjustment) is described. FIG. 12 is a diagram illustrating a rotation amount decreasing control of the skew adjustment motor 51 in a first reference position adjustment control.

In the case of FIG. 12, in which SkewB<SkewA_C holds in the first reference position adjustment control, the skew amount at the point C with respect to the predetermined value of the skew amount of the plane mirror 49c is (SkewC−SkewA)/2. In order to move from the point C to the reference position between the point C and point D', it is necessary to positively rotate the skew adjustment motor 51. Therefore, the skew adjustment motor 51 is rotated by the rotation amount obtained by adding the second rotation amount to the first rotation amount, which corresponds to the number of drive pulses necessary for moving the position of the plane mirror 49c by −(SkewC−SkewA)/2=(SkewA−SkewC)/2. In this way, the reference position becomes the point D' moved to the interval in which the skew amount decreases.

Here, if the sum of the first rotation amount and the second rotation amount is more than the number of drive pulses corresponding to the half period of the skew amount change, the reference position in the interval in which the skew amount decreases (the point D) exists at a position whose distance from the point C is shorter than that of the point D'. Therefore, the skew adjustment motor 51 is rotated by the rotation amount obtained by subtracting a fourth rotation amount, which corresponds to one period of the skew amount change, from the sum of the first rotation amount and the second rotation amount. In this way, the reference position moves from the point D' to the point D.

A calculation example of the reference position of the plane mirror 49c using specific values is described below. In FIG. 12, the coordinates of the point A is supposed to be (300, 945.47), the coordinates of the point B is supposed to be (539, −48.87), and the coordinates of the point C is supposed to be (778, −549.40).

SkewA_C=(945.47+(−549.40))/2=198.04 holds, and SkewB (=−48.87)<SkewA_C(=198.04) holds, and hence this corresponds to the Pattern 1 similarly to FIG. 8. The skew amount at the point C with respect to the predetermined value of the skew amount of the plane mirror 49c is (SkewC−SkewA)/2=(−549.40-945.47)/2=−747.44 (μm).

As the skew amount changes by 4.235 (μm) per one drive pulse of the skew adjustment motor 51, the third rotation amount is 747.44 (μm)/4.235 (μm)≈176 (pulses). In addition, as the second rotation amount is 478 (pulses) while the fourth rotation amount is 956, the third rotation amount plus the second rotation amount minus the fourth rotation amount is 176+478−956=−302 (pulses).

In other words, by rotating the skew adjustment motor 51 by −302 (pulses) from the point C, the reference position of the plane mirror 49c can be returned to the point D by the minimum number of drive pulses (motor rotation amount).

Figure 13:
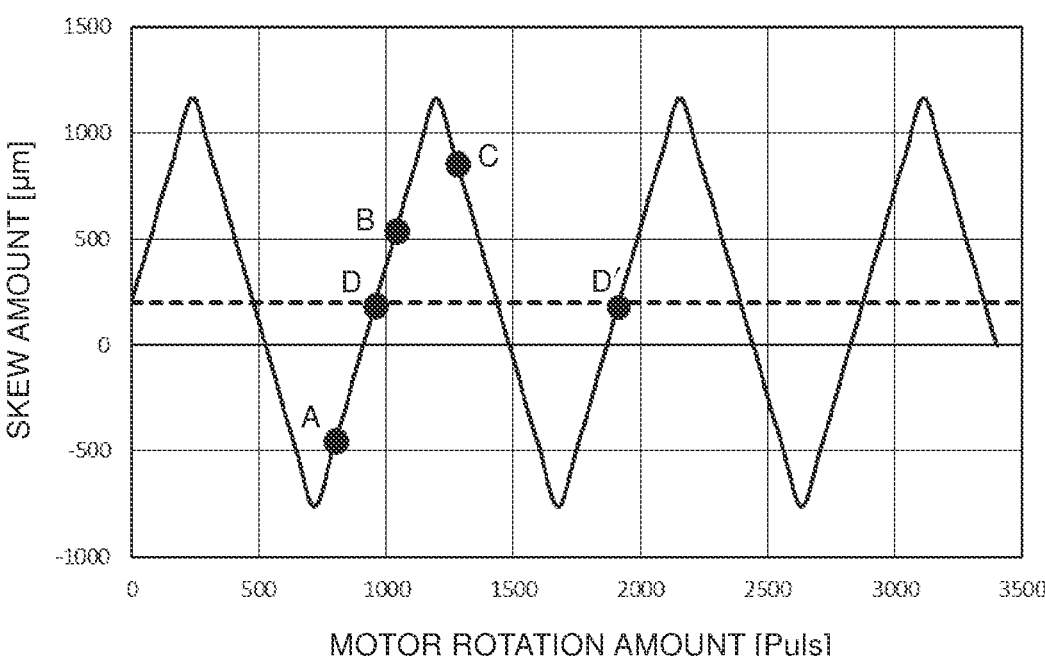
FIG. 13 is a diagram illustrating the rotation amount decreasing control of the skew adjustment motor in the second reference position adjustment.

Next, the case when returning to the reference position in the interval in which the skew amount increases with respect to the rotation direction of the skew adjustment motor 51 (second reference position adjustment) is described. FIG. 13 is a diagram illustrating the rotation amount decreasing control of the skew adjustment motor 51 in a second reference position adjustment control.

In the case of FIG. 13, in which SkewB≥SkewA_C holds in the second reference position adjustment control, the skew amount at the point C with respect to the predetermined value of the skew amount of the plane mirror 49c is (SkewC−SkewA)/2. In order to move from the point C to the reference position between the point C and the point D', it is necessary to positively rotate the skew adjustment motor 51. Therefore, the skew adjustment motor 51 is rotated by the rotation amount obtained by adding the second rotation amount to the third rotation amount, which corresponds to the number of drive pulses necessary for moving the position of the plane mirror 49c by (SkewC−SkewA)/2. In this way, the reference position becomes the point D' moved to the interval in which the skew amount increases.

Here, if the sum of the third rotation amount and the second rotation amount is more than the number of drive pulses corresponding to the half period of the skew amount change, the reference position in the interval in which the skew amount increases (the point D) exists at a position whose distance from the point C is shorter than that of point D'. Therefore, the skew adjustment motor 51 is rotated by the rotation amount obtained by subtracting the fourth rotation amount, which corresponds to one period of the skew amount change, from the sum of the third rotation amount and the second rotation amount. In this way, the reference position moves from the point D' to the point D.

A calculation example of the reference position of the plane mirror 49c using specific values is described below. In FIG. 13, the coordinates of the point A is supposed to be (800, −454.05), the coordinates of the point B is supposed to be be (1039, 537.51), and the coordinates of the point C is supposed to be (1278, 857.35).

SkewA_C=(−454.05+857.35)/2=201.65 holds, and SkewB (=537.51)≥SkewA_C(=201.05) holds, and hence this corresponds to the Pattern 2 similarly to FIG. 11. The skew amount at the point C with respect to the predetermined value of the skew amount of the plane mirror 49c is (SkewC−SkewA)/2=(857.35−(−454.05))/2=655.7 (μm).

As the skew amount changes by 4.235 (μm) per one drive pulse of the skew adjustment motor 51, the third rotation amount is 655.7 (μm)/4.235 (μm)≈155 (pulses). In addition, the second rotation amount is 478 (pulses) while the fourth rotation amount is 956, the third rotation amount plus the second rotation amount minus the fourth rotation amount is 155+478−956=−323 (pulses).

In other words, by rotating the skew adjustment motor 51 by −323 (pulses) from the point C, the reference position of the plane mirror 49c can be returned to the point D by the minimum number of drive pulses (motor rotation amount).

Figure 14:
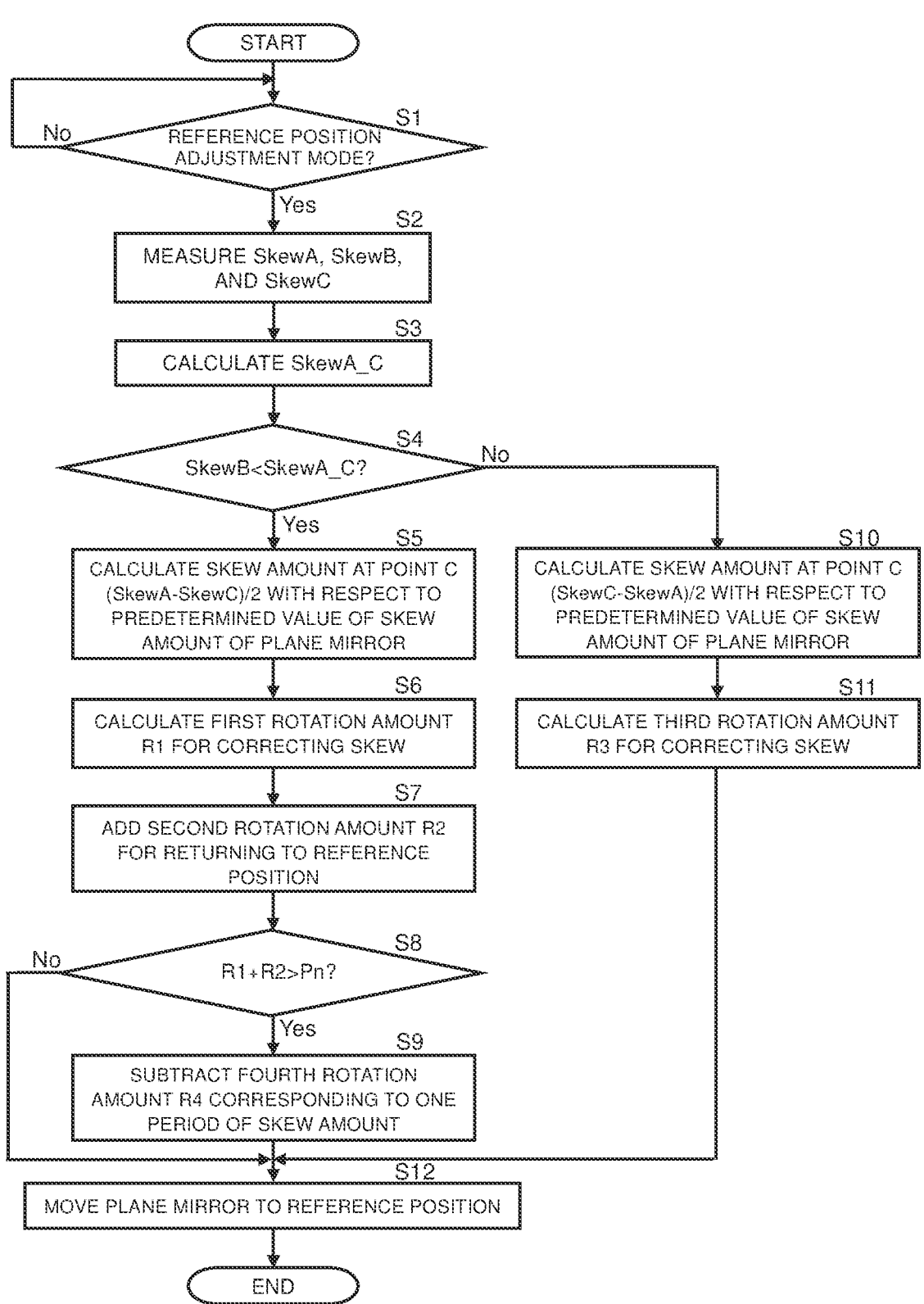
FIG. 14 is a flowchart illustrating a control example of the first reference position adjustment of a plane mirror of the optical scanning device, which is performed in the image forming apparatus.

FIG. 14 is a flowchart illustrating a control example of the first reference position adjustment of the plane mirror 49c of the optical scanning device 5, which is performed in the image forming apparatus 100. With reference to FIGS. 1 to 13 as necessary, an execution procedure of the first reference position adjustment of the plane mirror 49c is described along with steps in FIG. 14.

The control unit 90 determines whether or not it is execution timing of a reference position adjustment mode (Step S1). The reference position adjustment mode is executed, for example, every time when the accumulated number of printed sheets from just previous execution timing of the reference position adjustment mode reaches a predetermined number (such as 10 k).

If it is the execution timing of the reference position adjustment mode (Yes in Step S1), the control unit 90 measures the skew amounts SkewA, SkewB, and SkewC at a first point, a second point, and a third point, respectively, in which the rotation amount of the skew adjustment motor 51 increases in order of the first, second, and third points (points A, B, and C in FIGS. 8 and 9), obtained by equally dividing the position change of the plane mirror 49c per a half period into two (Step S2). Specifically, in the states where the plane mirror 49c is moved to the point A, B, and C, a reference image for color shift correction is formed on the intermediate transfer belt 8, and the image density sensor 25 measures the reference image, so as to measure SkewA, SkewB, and SkewC.

Next, the control unit 90 calculates average value SkewA_C of SkewA and SkewC (Step S3). Then, it is determined whether or not SkewB<SkewA_C holds (Step S4). If SkewB<SkewA_C holds (Yes in Step S4), the skew amount at the point C (SkewA−SkewC)/2 with respect to the predetermined value of the skew amount of the plane mirror 49c is calculated (Step S5).

Next, the control unit 90 calculates the first rotation amount R1 of the skew adjustment motor 51 for correcting the skew of the plane mirror 49c (returning to origin position), on the basis of the skew amount at the point C with respect to the predetermined value of the skew amount of the plane mirror 49c calculated in Step S5, and the change amount of the skew amount per one drive pulse of the skew adjustment motor 51 (Step S6). Furthermore, the second rotation amount R2 is added for returning the reference position to the interval in which the skew amount decreases (Step S7). In this way, the number of drive pulses R1+R2 is calculated for returning the plane mirror 49c to the reference position D.

Next, the control unit 90 determines whether or not R1+R2 is more than the number of drive pulses Pn that corresponds to the half period of the skew amount change of the plane mirror 49c (Step S8). If R1+R2>Pn holds (Yes in Step S8), the fourth rotation amount R4 corresponding to one period of the skew amount change is subtracted from R1+R2 (Step S9). If R1+R2≤Pn holds (No in Step S8), R1+R2 is maintained without subtracting R4.

If SkewB≥SkewA_C holds (No in Step S4), the skew amount at the point C (SkewC−SkewA)/2 with respect to the predetermined value of the skew amount of the plane mirror 49c is calculated (Step S10). Next, the control unit 90 calculates the third rotation amount R3 of the skew adjustment motor 51 for correcting the skew of the plane mirror 49c (returning to origin position), on the basis of the skew amount at the point C with respect to the predetermined value of the skew amount of the plane mirror 49c calculated in Step S8, and the change amount of the skew amount per one drive pulse of the skew adjustment motor 51 (Step S11).

Lastly, the skew adjustment motor 51 is driven by the drive pulses calculated in Step S7, S9, or S11 (Step S12), and the plane mirror 49c is moved to the reference position (the point D), and the reference position adjustment mode is finished.

Figure 15:
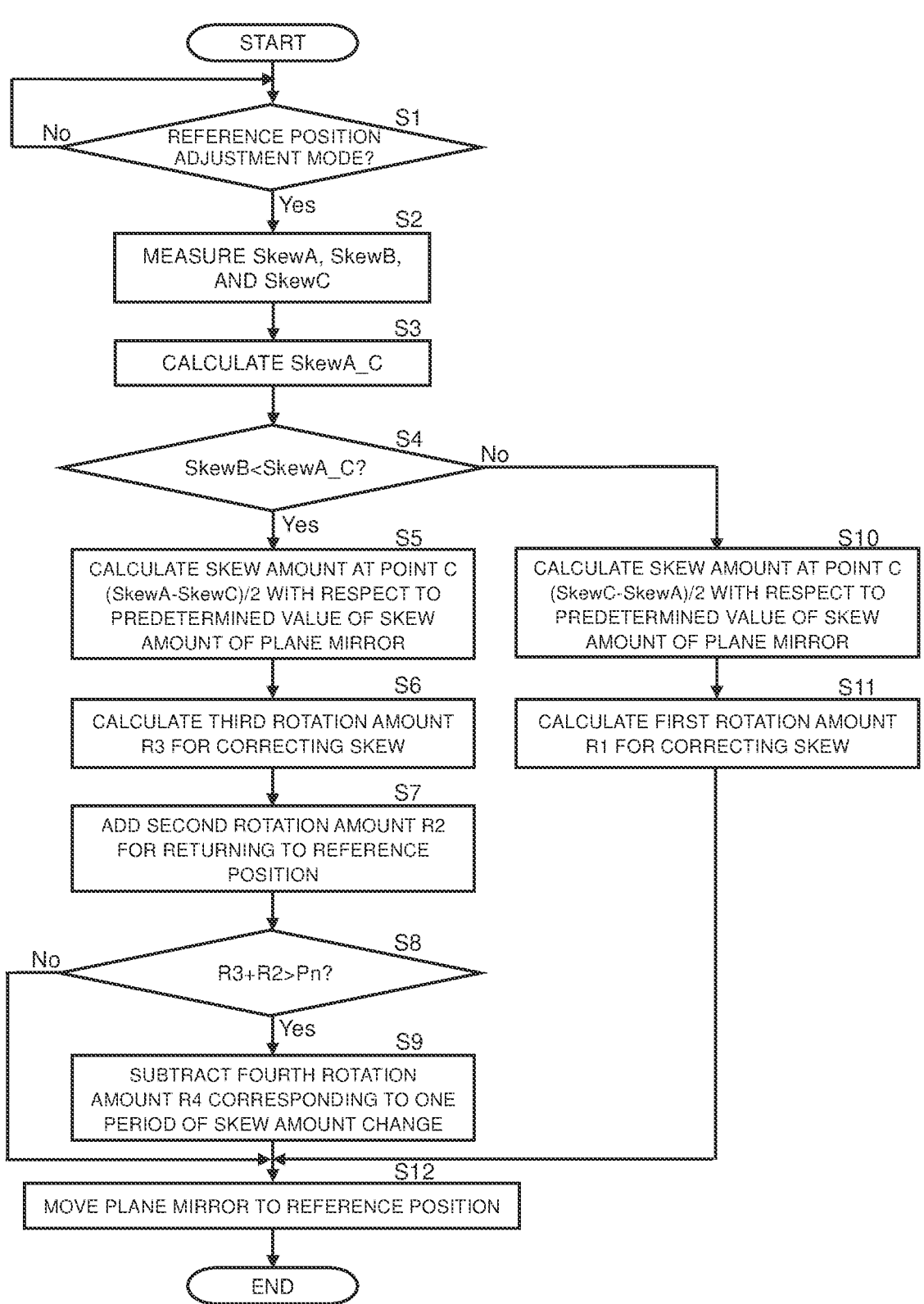
FIG. 15 is a flowchart illustrating a control example of the second reference position adjustment of the plane mirror of the optical scanning device, which is performed in the image forming apparatus.

FIG. 15 is a flowchart illustrating a control example of the second reference position adjustment of the plane mirror 49c of the optical scanning device 5, which is performed in the image forming apparatus 100. In the second reference position adjustment illustrated in FIG. 15, it is determined whether or not SkewB<SkewA_C holds (Step S4). If SkewB<SkewA_C holds (Yes in Step S4), the skew amount at the point C (SkewC−SkewA)/2 with respect to the predetermined value of the skew amount of the plane mirror 49c is calculated (Step S10).

Next, the control unit 90 calculates the first rotation amount R1 of the skew adjustment motor 51 for correcting the skew of the plane mirror 49c (returning to origin position), on the basis of the skew amount at the point C with respect to the predetermined value of the skew amount of the plane mirror 49c calculated in Step S10, and the change amount of the skew amount per one drive pulse of the skew adjustment motor 51 (Step S11).

In contrast, if SkewB≥SkewA_C holds (No in Step S4), the skew amount at the point C (SkewA−SkewC)/2 with respect to the predetermined value of the skew amount of the plane mirror 49c is calculated (Step S5).

Next, the control unit 90 calculates the third rotation amount R3 of the skew adjustment motor 51 for correcting the skew of the plane mirror 49c (returning to origin position), on the basis of the skew amount at the point C with respect to the predetermined value of the skew amount of the plane mirror 49c calculated in Step S5, and the change amount of the skew amount per one drive pulse of the skew adjustment motor 51 (Step S6). Furthermore, the second rotation amount R2 is added for returning the reference position to the interval in which the skew amount decreases (Step S7). In this way, the number of drive pulses R3+R2 is calculated for returning the plane mirror 49c to the reference position D.

Further, it is determined whether or not R3+R2 is more than the number of drive pulses Pn that corresponds to the half period of the skew amount change of the plane mirror 49c (Step S8). If R3+R2>Pn holds (Yes in Step S8), the fourth rotation amount R4 corresponding to one period of the skew amount change is subtracted from R3+R2 (Step S9). Other steps than the above are the same as those in the first reference position adjustment illustrated in FIG. 14.

According to the control examples illustrated in FIGS. 14 and 15, even if the power supply is turned off during drive of the skew adjustment motor 51, inversion between the rotation direction of the skew adjustment motor 51 of the skew adjustment mechanism 50 and the direction to move the plane mirror 49c does not occur, and the skew adjustment can always be performed correctly, and it is possible to prevent image quality from deteriorating due to color shift.

In addition, it is not necessary to mount an encoder to the skew adjustment motor 51 or to dispose an optical sensor or the like for detecting position of the plane mirror 49c, and hence it is possible to suppress increase in cost of the optical scanning device 5 and the image forming apparatus 100.

Note that although not illustrated in FIGS. 14 and 15, after the reference position adjustment mode is finished, the reference image for color shift correction is formed again on the intermediate transfer belt 8, and the image density sensor 25 reads the reference image so as to measure skew amount of a scan line. Then, on the basis of the measured skew amount, the number of drive pulses of the skew adjustment motor 51 is calculated, and the skew adjustment motor 51 is driven so as to adjust skew (inclination) of the scan line.

In addition, if SkewB=SkewA_C holds in Step S4 of FIG. 14 or 15, it indicates that average of the skew amounts at the points A and C is equal to the skew amount at the point B, and that the points A, B, and C are on a straight line. In this case, the reference position of the plane mirror 49c is not deviated, and hence the skew of the scan line can be adjusted by returning the plane mirror 49c to the point A. Alternatively, it may be possible to perform the skew adjustment of the scan line described above after temporarily returning the plane mirror 49c to the reference position (the point D).

Other than that, the present disclosure is not limited to the embodiment described above, but can be variously modified within the scope of the present disclosure without deviating from the spirit thereof. For instance, in the embodiment described above, the method of adjusting the reference position of the plane mirror 49c when adjusting the scanning inclination of the plane mirror 49c is described, but the optical element whose reference position can be adjusted by the embodiment described above is not limited to the plane mirrors 49a to 49c. For instance, it can also be used for adjusting the reference position of the second scanning lens 47c that is elongated in the main scanning direction.

In addition, the embodiment described above exemplifies the skew adjustment mechanism 50 constituted of the skew adjustment motor 51 and the eccentric cam 52, but it may be possible to use the skew adjustment mechanism 50 having other structure, as long as the skew adjustment motor 51 is rotated in a fixed direction so that the position of the optical element is periodically changed.

For instance, instead of the eccentric cam 52, it may possible to use a first gear having a cam follower that is an annular protrusion protruding from a side surface, and a second gear having a cam surface facing the cam follower. The cam follower is provided with bumps and dips for changing axial distance by a predetermined amount always with respect to a unit rotation angle of the first gear in the circumferential direction. In addition, the number of gear teeth is different between the first gear and the second gear. In this way, when the skew adjustment motor 51 rotates the first gear and the second gear, center distance between the first gear and the second gear is periodically changed. Using this change of the center distance, the optical element is displaced.

In addition, as the image forming apparatus 100 equipped with the optical scanning device 5, a tandem type color printer is exemplified in the above description, but the present disclosure can be applied not only to the color printer but also to an electrophotographic color image forming apparatus such as a color copier or a facsimile machine, or an electrophotographic monochrome image forming apparatus such as a monochrome printer or a monochrome multifunction peripheral.

The present disclosure can be used for an optical scanning device that emits light to an image carrier so as to form an electrostatic latent image. Using the present disclosure, it is possible to provide an optical scanning device that can move an optical member to an initial position by adjusting rotation of a motor, and an image forming apparatus equipped with the same, without using an encoder or a sensor.

What is claimed is:

1. An optical scanning device for exposing a surface of an image carrier so as to form an electrostatic latent image whose charge is decreased, the optical scanning device comprising:

a scanning optical system that scans the image carrier with a light beam;

a housing that holds optical elements constituting the scanning optical system;

a skew adjustment mechanism that corrects scanning inclination by changing position of the optical element from a reference position; and a control unit that controls drive of the skew adjustment mechanism, wherein the skew adjustment mechanism includes a skew adjustment motor for adjusting an angle of the optical element, and rotates the skew adjustment motor in a fixed direction so that the position of the optical element changes periodically, and that when rotating the skew adjustment motor by a rotation amount corresponding to a half period of position change of the optical element from an arbitrary position of the optical element, average value of the position change of the optical element before and after rotating the skew adjustment motor is substantially the same as average value of the position change of the optical element per one period, when returning the optical element to the reference position, the control unit forms a reference image on the image carrier at three points obtained by equally dividing the position change of the optical element per half period into two, so as to measure skew amounts of the optical element, and calculates rotation amount of the skew adjustment motor necessary for returning the optical element to the reference position, on the basis of rotation amounts of the skew adjustment motor when moving the optical element to the three points, and skew amounts measured at the three points, the skew amounts at a first point, a second point, and a third point, in which the rotation amount of the skew adjustment motor increases in order of the first, second, and third points, obtained by equally dividing the position change of the plane mirror per a half period into two, are represented by SkewA, SkewB, and SkewC, respectively, the control unit checks a large or small relationship between SkewB and average value SkewA_C of SkewA and SkewC, in a first reference position adjustment for returning the optical element to the reference position in an interval in which the skew amount decreases with respect to rotation direction of the skew adjustment motor, if SkewB<SkewA_C holds, the control unit rotates the skew adjustment motor by rotation amount obtained by adding a second rotation amount, which corresponds to a half period of the position change of the optical element, to a first rotation amount corresponding to (SkewA−SkewC)/2, while if SkewB≥SkewA_C holds, the control unit rotates the skew adjustment motor by a third rotation amount corresponding to (SkewC−SkewA)/2, and in a second reference position adjustment for returning the optical element to the reference position in an interval in which the skew amount increases with reference to the rotation direction of the skew adjustment motor, if SkewB<SkewA_C holds, the control unit rotates the skew adjustment motor by the first rotation amount, while if SkewB≥SkewA_C holds, the control unit rotates the skew adjustment motor by rotation amount obtained by adding the second rotation amount to the third rotation amount.

2. The optical scanning device according to claim 1, wherein in the first reference position adjustment, if the sum of the first rotation amount and the second rotation amount is more than the rotation amount corresponding to the half period of the position change of the optical element, the skew adjustment motor is rotated by rotation amount obtained by subtracting a fourth rotation amount, which corresponds to one period of the position change of the optical element, from the sum of the first rotation amount and the second rotation amount, and in the second reference position adjustment, if the sum of the third rotation amount and the second rotation amount is more than the rotation amount corresponding to the half period of the position change of the optical element, the skew adjustment motor is rotated by rotation amount obtained by subtracting the fourth rotation amount from the sum of the third rotation amount and the second rotation amount.

3. The optical scanning device according to claim 1, wherein the skew adjustment motor is a stepping motor whose rotation amount can be adjusted by the number of drive pulses.

4. The optical scanning device according to claim 1, wherein the optical element is the plane mirror closest to the image carrier.

5. An image forming apparatus comprising:

one or more image carriers having a surface on which a photosensitive layer is formed;

a charging device that charges the image carrier at a predetermined surface potential; and the optical scanning device according to claim 1, which exposes the surface of the image carrier charged by the charging device, so as to form an electrostatic latent image whose charge is decreased.

* * * * *